(No Model.)
C. A. SMITH.
EXCAVATING MACHINE.
No. 534,973. Patented Feb. 26, 1895.
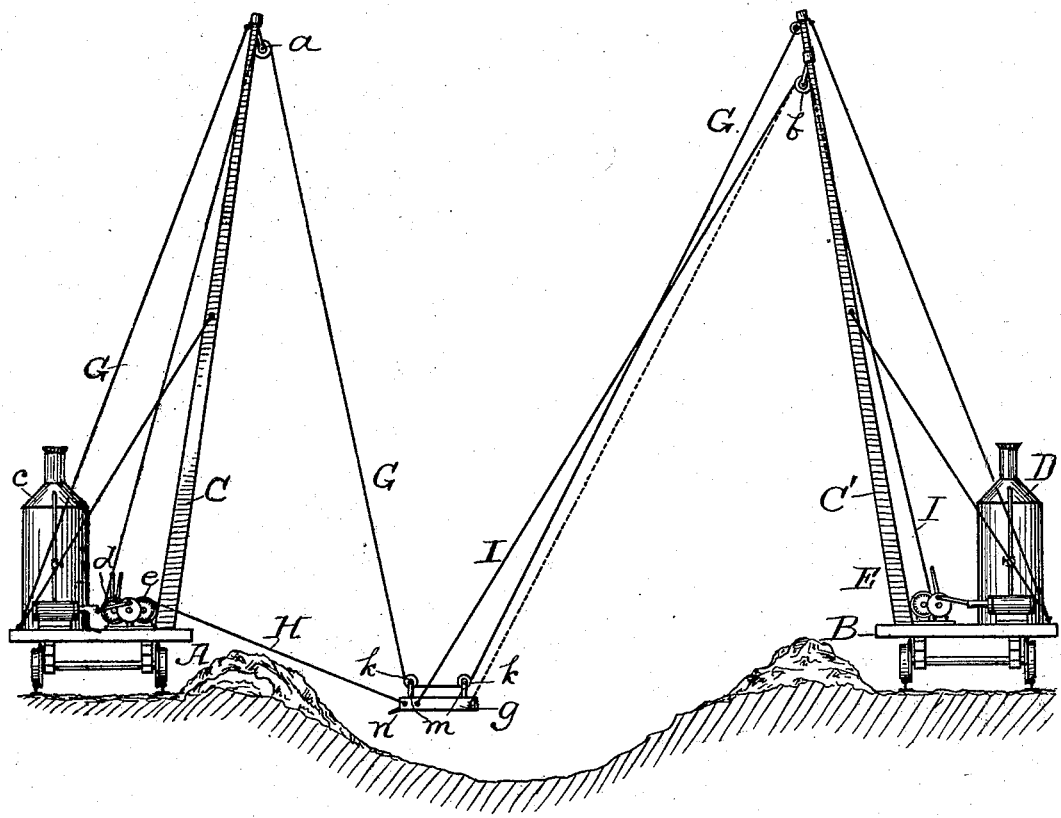
Witnesses:
R. J. Jacker,
Theo B. Heller
Inventor:
Charles A. Smith
By Frank D. Thomason
Atty.

UNITED STATES PATENT OFFICE.

CHARLES A. SMITH, OF CHICAGO, ILLINOIS.

EXCAVATING-MACHINE.

SPECIFICATION forming part of Letters Patent No. 534,973, dated February 26, 1895.

Application filed October 31, 1894. Serial No. 527,539. (No model.)

*To all whom it may concern:*

Be it known that I, CHARLES A. SMITH, of Chicago, Cook county, Illinois, have invented certain new and useful Improvements in Excavating-Machines, of which the following is a full, clear, and exact description, reference being had to the accompanying drawing, and to the letters of reference marked thereon.

The object of my invention is to provide a simple yet powerful and effective excavating machine, which is best adapted for work of considerable magnitude, substantially as hereinafter fully described, and as illustrated in the drawing, in which the figure is a side elevation of my invention.

Reference being had to the drawing A and B represent two platforms, each of which is supported on suitable trucks, located, one on each side of the proposed excavation, on tracks, which are parallel to the line of excavation and to each other. Each of these platforms is provided with masts C, C', on the sides thereof coming nearest each other, which, preferably, incline toward each other, and near the tops of each of these masts I secure, in any suitable manner, the sheaves $a$ and $b$, about as shown. The left hand platform A is provided with a stationary engine $c$, which drives and revolves a lifting-rope drum $d$, and a draft-rope drum $e$, each of which is independent of the other but capable of being simultaneously revolved or otherwise, as desired. The right hand platform B is also provided with a stationary engine D, which drives and revolves the drum E, journaled in suitable bearings on said platform.

Wound upon and extended from drum $d$ is a lifting-rope or cable G. This rope G extends in a vertical direction to and passes around sheave $a$, end then downward and then upward again to the top of the mast C', where its contiguous end is securely fastened. Suspended on this rope G, between the masts C and C', is a scoop or shovel $g$, which, as shown, is provided with travelers or grooved wheels $k$, $k$, located, respectively, over the front and over the rear portions of said scoop, to which they are connected by suitable links or hangers $m$. This scoop is provided with a shovel-edge $n$, which projects froward and at a downward angle from the front edge of the bottom of said scoop, and said scoop is provided with a suitable bail or clevis $o$ to which the draft-rope H is attached in any suitable manner. This draft-rope H extends in a direct line from the scoop to the drum $e$, by means of which it is wound up or paid out as necessary and as will hereinafter be more fully explained.

Secured, preferably, to the near front end of the body of the scoop is another cord or cable I, which extends from the same, up to and around sheave $b$, from whence it extends down to the drum E on platform B.

The operation of my invention is, briefly, as follows: The lifting rope is paid out until the scoop reaches the depth desired, and at the same time the draft-rope is paid out and the rope I is wound up on the drum E, so as to cause the scoop to gravitate on the said lifting rope to the position at which the excavating is to commence. The shaft-rope is then slowly wound up, dragging the scoop toward it until said scoop is loaded, whereupon the lifting rope is wound on its drum and the draft-rope and rope I are so manipulated as to move the scoop to the place, in line with said lifting rope, where it is desired to discharge the scoop.

Rope I may be secured to other points on the body of the scoop than at the forward end. For instance, as shown in dotted lines in the drawing, rope I may be fastened to the rear of the scoop and may be made to serve the purpose of regulating the depth of the excavation by drawing it taut, as well as being used, in combination with the other ropes to direct the scoop to the position at which it is desired the excavating movement should commence.

What I claim as new is—

The combination with two platforms located a given distance apart, each having a mast arising therefrom and suitable engines therefor, sheaves secured to the upper portions of said masts, a draft-rope drum and a lifting-rope drum journaled on one of said platforms, and a single drum journaled on the other platform, of a lifting-rope having one end wound around upon said lifting-rope drum and extending from thence to and around the sheave of the adjacent mast and then to the upper portion of the mast of the other platform, a scoop suspended on said lifting-rope between said masts, a draft-rope wound upon said draft-rope drum and extending direct to said scoop, and a regulating rope secured at one end to said scoop and extending from thence to the sheave on the mast to the top of which one end of said lifting-rope is secured and from thence to and around the single drum on the platform from which said mast arises, as and for the purpose set forth.

CHARLES A. SMITH.

Witnesses:
FRANK D. THOMASON,
SAMUEL E. THOMASON.